Dec. 14, 1926.
O. A. BANNER
FLEXIBLE COUPLING
Filed June 9, 1924
1,610,844
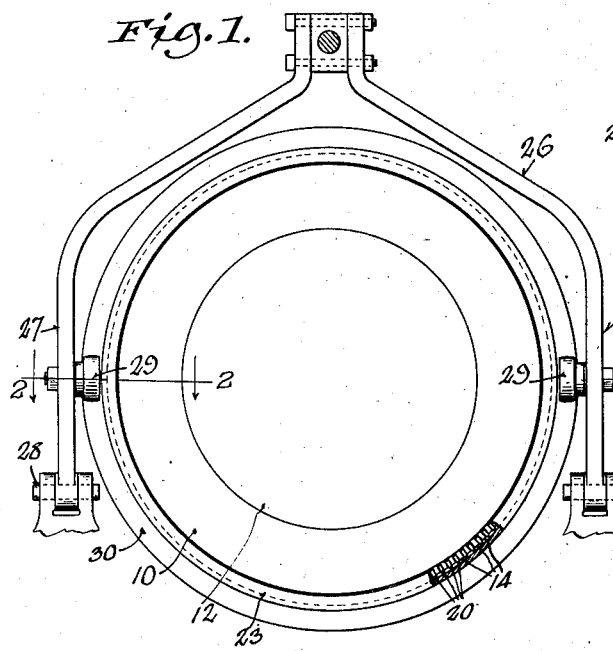
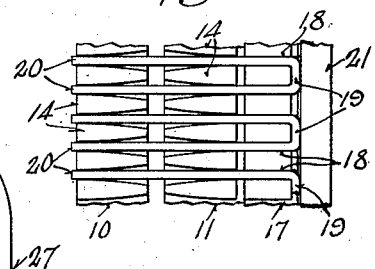
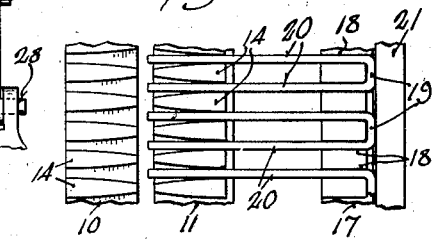
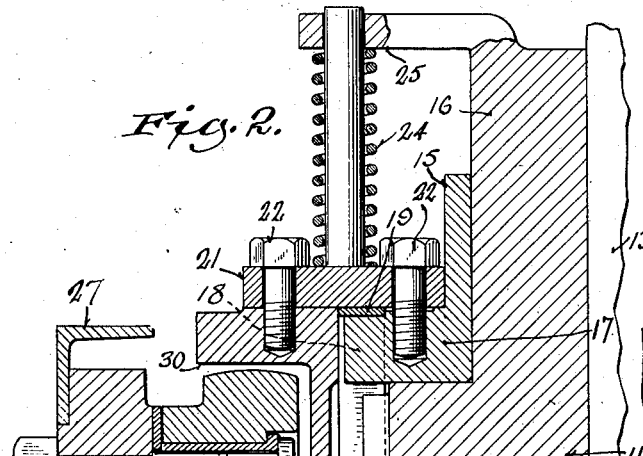
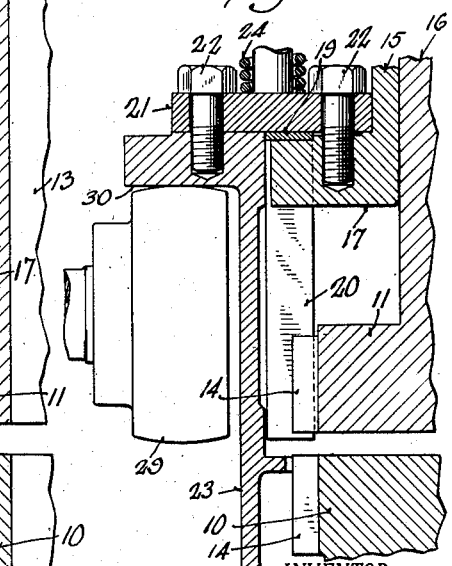
INVENTOR.
OTTO A. BANNER
BY Ralph W. Brown
ATTORNEY.

Patented Dec. 14, 1926.

1,610,844

UNITED STATES PATENT OFFICE.

OTTO A. BANNER, OF MILWAUKEE, WISCONSIN, ASSIGNOR TO THE FALK CORPORATION, OF MILWAUKEE, WISCONSIN, A CORPORATION OF WISCONSIN.

FLEXIBLE COUPLING.

Application filed June 9, 1924. Serial No. 718,789.

This invention relates to flexible couplings.

One object of the present invention is the provision of a flexible coupling so constructed as to permit a ready release thereof.

Other objects and advantages will appear from the following description of an illustrative embodiment of the invention.

Figure 1 is a side elevation of a flexible coupling constructed in accordance with the present invention.

Figure 2 is a fragmentary sectional view thereof on a larger scale, taken substantially on line 2—2 of Figure 1.

Figure 3 is a view similar to Figure 2 illustrating the position of the parts when in released position.

Figures 4 and 5 are detail views illustrating the relation between cooperating parts when the coupling is in engaged and released conditions, respectively.

The coupling shown comprises two substantially cylindrical coupling elements 10 and 11, keyed to shafts 12 and 13, respectively. Either of the shafts may be the driving shaft and the other the driven shaft. The adjacent ends of the coupling elements are each formed with a series of radial teeth or projections 14 disposed about the periphery thereof. The teeth extend in a direction substantially parallel to the axes of the shafts, the side walls thereof being curved longitudinally so that the spaces between the teeth comprise inwardly flaring grooves such as shown and described in the patent to James Bibby, No. 1,391,713.

A collar 15 is mounted to slide upon the reduced portion 16 of coupling element 11. This collar is provided with an integral flange or shoulder 17 grooved as at 18 to receive a series of U-shaped members 19 of spring metal, each having a pair of substantially flat resilient limbs 20 projecting parallel to the shafts and adapted to fit snugly in the spaces between the teeth 14. A clamp ring 21 removably fixed to the flange 17 by a series of screws 22, or otherwise, retains the members 19 in fixed position in the flange. A lubricant retainer ring or casing 23 fixed to the clamp ring 21 surrounds and houses the teeth 14 and limbs 20.

The collar 15 is normally retained in the position shown in Figure 2 preferably by the use of a series of compression springs one of which is shown at 24. These springs are interposed between the clamp ring 21 and a collar 25 fixed to the reduced portion 16 of the coupling element 11. The arrangement is such that with the parts in this position each of the limbs 20 is lodged between and firmly embraced by successive teeth 14 of both coupling elements 10 and 11 so as to offer a maximum resistance to relative rotation between the elements. This embracing action is accentuated by the canting of the several limbs under the transmitted load. The limbs together thus constitute a torque transmitting means of such capacity which affords the desired resiliency under light loads, and ample resistance during the transmission of heavy loads. The resiliency of the limbs tends to smooth out fluctuations in the transmitted torque and the flexibility of the limbs permits smooth operation even with the shafts 12 and 13 somewhat out of alignment.

To release the coupling the collar 15 is shifted along the reduced portion 16 of the coupling element 11, against the pressure of springs 24, toward the position of Figure 3, until the limbs 20 have been withdrawn lengthwise out of engagement with the teeth 14 of the coupling element 10 (see Figure 5). This movement of the collar 15 may be effected in various ways. In the coupling shown, however, this is accomplished by means of a control yoke 26, having limbs 27, rockably supported at their lower ends upon fixed pivots 28. The limbs 27 carry rollers 29 arranged to bear at diametrically opposite points upon an annular surface 30 provided on the housing 23. During the normal closed condition of the coupling the rollers 29 are slightly spaced from the surface 30 so as to avoid wearing contact therebetween during operation. By rocking the yoke 26 so as to shift the rollers in the direction toward the surface 30 the housing 23 and consequently the limbs 20 are shifted to the position of Figures 3 and 5 and the coupling is released.

Various changes may be made in the embodiment of the invention hereinabove described, without departing from or sacrificing any of the advantages of the invention as defined in the appended claims.

I claim:

1. In a flexible coupling the combination of driving and driven coupling elements, a series of flexible torque transmitting limbs each embraced within both of said elements, and means for disengaging said series of limbs lengthwise from one of said elements.

2. In a flexible coupling the combination of driving and driven coupling elements spaced in fixed relation to each other, a series of resilient torque transmitting limbs each embraced within both of said elements, and unitary means for disengaging said series of limbs from one of said elements.

3. In a flexible coupling the combination of driving and driven coupling elements, openings in each of said elements, resilient torque transmitting means lodged in said openings in both elements and frictionally retained therein under the transmitted load, and means for releasing said coupling.

4. In a flexible coupling the combination of driving and driven coupling elements spaced in fixed relation to each other, a series of resilient torque transmitting limbs engaging said elements, and a ring connected with said limbs and movable therewith to release the coupling.

5. In a flexible coupling the combination of driving and driven coupling elements spaced in fixed relation to each other, resilient torque transmitting limbs engaging said elements, and means for effecting a relative movement between said torque transmitting means and elements to release the coupling.

6. In a flexible coupling the combination of driving and driven coupling elements, resilient torque transmitting means engaging said elements, a lubricant retainer ring housing said torque transmitting means and movable therewith, and means for effecting relative movement between said torque transmitting means and elements to release the coupling.

7. In a flexible coupling the combination of driving and driven coupling elements, flexible torque transmitting means releasably engaged by each of said elements, and means for withdrawing said torque transmitting means through one of said elements thereby releasing the coupling.

8. In a flexible coupling the combination of driving and driven coupling elements, spaced in fixed relation to each other, openings in each of said elements, resilient torque transmitting means lodged in said openings and frictionally retained therein under transmitted load, and unitary means for disengaging said last named means thereby releasing the coupling.

In witness whereof, I hereunto subscribe my name this 22 day of May, 1924.

OTTO A. BANNER.